United States Patent [19]
Thögersen et al.

[11] Patent Number: 5,947,494
[45] Date of Patent: Sep. 7, 1999

[54] CATERING CART CONNECTABLE TO A SIMILAR CATERING CART

[75] Inventors: Lars Höjgaard Thögersen, Köpenhamn; Nils Toft, Naerum, both of Denmark

[73] Assignee: Scandinavian Airlines Systems, Stockholm, Sweden

[21] Appl. No.: 08/973,855

[22] PCT Filed: Apr. 24, 1997

[86] PCT No.: PCT/SE97/00688

§ 371 Date: Mar. 17, 1998

§ 102(e) Date: Mar. 17, 1998

[87] PCT Pub. No.: WO97/39653

PCT Pub. Date: Oct. 30, 1997

[30] Foreign Application Priority Data

Apr. 25, 1996 [SE] Sweden .................................. 9601579

[51] Int. Cl.$^6$ ...................................................... B62B 3/02
[52] U.S. Cl. ........................................ 280/79.2; 280/47.35
[58] Field of Search ............................... 280/79.11, 79.2, 280/79.3, 47.34, 47.35, 47.17, 47.131, 47.19, 47.18, 47.24, 47.26, 33.991, 33.992, 504

[56] References Cited

U.S. PATENT DOCUMENTS

| | | | |
|---|---|---|---|
| 3,971,568 | 7/1976 | Wright | 280/47.35 |
| 4,948,154 | 8/1990 | Guggenheim | 280/47.35 |
| 4,986,555 | 1/1991 | Andreen | 280/47.35 |
| 5,462,299 | 10/1995 | Maddax | 280/47.35 |
| 5,489,106 | 2/1996 | Engelking et al. | 280/47.35 |
| 5,829,767 | 11/1998 | Grossman | 280/47.35 |

Primary Examiner—Richard M. Camby
Attorney, Agent, or Firm—John Lezdey & Assoc

[57] ABSTRACT

A catering cart whose height is substantially greater than its width and its length, and particularly a catering cart for use in confined spaces, such as in the aisles of passenger aircraft and railway diners. The cart is supported on four wheels, at least two of which are castor wheels, and has an access opening on one side thereof. Two such carts can be mutually coupled with the sides opposite the access openings facing towards one another, with the aid of mutually identical coupling devices on each respective cart. Each of the coupling devices can be operated from that side of the cart which presents the access opening. The opposite side of the cart includes an overhang such that prior to coupling the carts together a gap is provided in the bottom region of the back-to-back cart combination in the vicinity of the coupling devices, this gap being brought to zero when the carts are coupled together, such that the carts will be supported in a sloping position solely by the outer pairs of wheels.

5 Claims, 4 Drawing Sheets

CATERING CART CONNECTABLE TO A SIMILAR CATERING CART

BACKGROUND OF THE INVENTION

1. Field of the Invention

The present invention relates to a service cart or trolley and then particularly to a catering cart or trolley for use in confined spaces such as in the aisles of passenger aircraft and railway diners. The cart is supported on four wheels, at least two of which are castor wheels, and has an access opening on one side thereof. Two such carts can be mutually coupled with the sides opposite the access openings facing towards one another, with the aid of mutually identical coupling means on each respective cart.

2. Description of the Prior Art

The catering carts of the kind intended here can be attended to from two opposite directions and are normally designed to carry food trays placed from the bottom of the trolley and upwards, although the carts may alternatively be designed for other purposes. The known catering carts, however, are encumbered with certain drawbacks. For instance, because they shall be attended from both ends of the cart they have a length which corresponds to twice the length of a food tray. Another drawback is that the personnel in attendance are forced to bend or squat in order to reach trays located at the bottom of the trolley. This is an uncomfortable task and is liable to result in bodily wear and tear in the passage of time. Even when the cart is loaded from only one side, i.e. does not require the presence of two attendants, it is still necessary to attend to the cart as a whole, for instance in an aircraft.

SUMMARY OF THE INVENTION

An object of the present invention is to avoid handling of catering carts in a manner that involves unnecessary strenuous work on the part of catering personnel. This object is achieved with a catering cart or trolley that has the characterizing features set forth in the following claims, therewith facilitating the work of the catering personnel in connection with such catering carts and with only one person in attendance.

BRIEF DESCRIPTION OF THE PREFERRED DRAWINGS

The invention will now be described in more detail with reference to an exemplifying embodiment thereof and also with reference to the accompanying drawings, in which FIG. 1 is a schematic illustration of an inventive catering cart; FIG. 2 illustrates schematically two mutually connectable inventive catering carts; and FIGS. 3 and 4 illustrate a coupling by means of which said carts can be mutually coupled.

DESCRIPTION OF THE PREFERRED EMBODIMENTS

Figure 1:
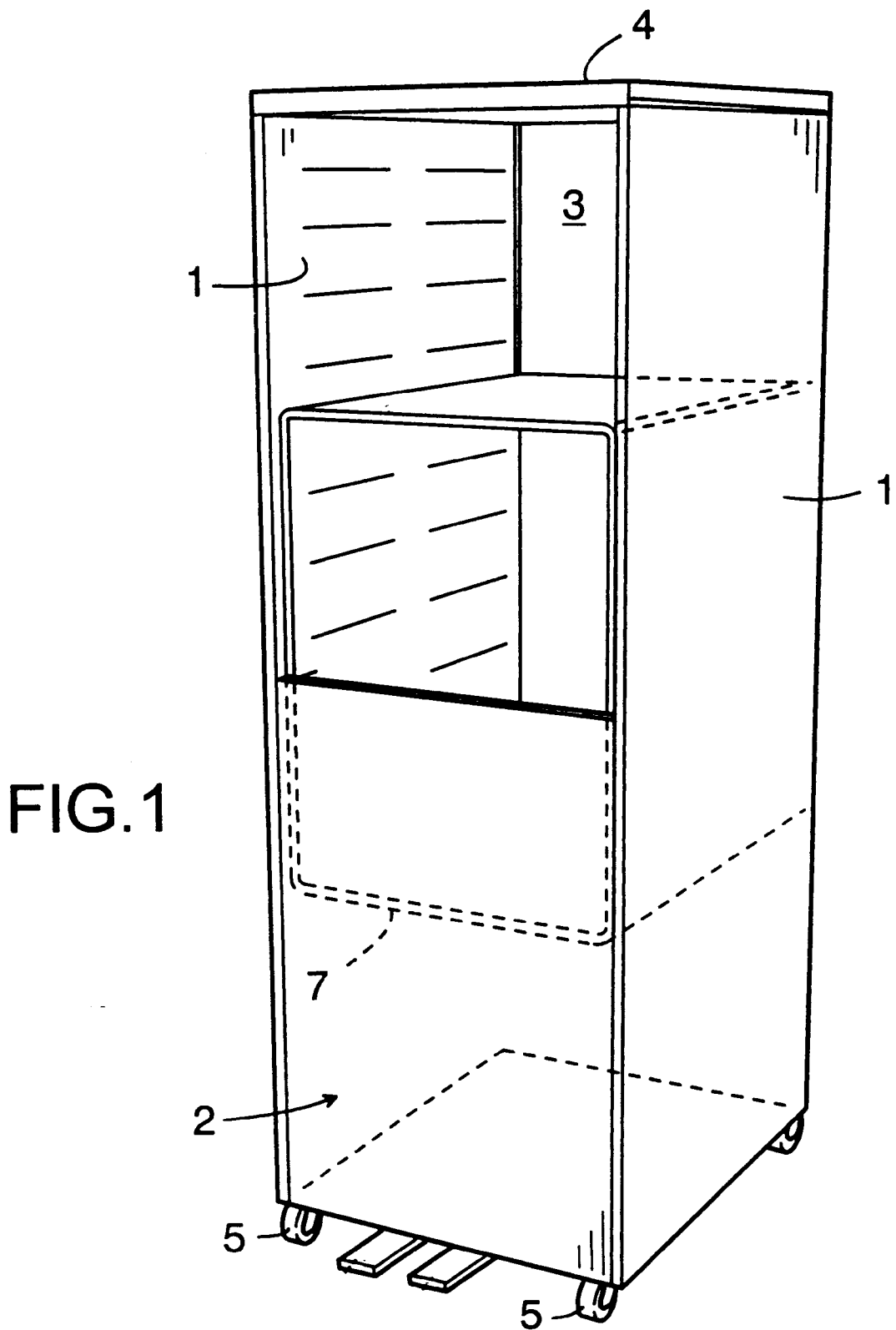

FIG. 1 illustrates schematically an inventive catering cart that comprises two sides 1, a front 2, a back 3 and a top 4. The cart is supported on four wheels, of which the rear wheels 5 are castors. The cart interior can be reached typically from the front 2 of the cart, through an opening in the upper half of the cart, this opening being closeable by means of a shutter or flap (not shown). The cart also includes an insert 7 which occupies, in principle, the bottom half of the cart space and which is constructed to provide a serving facility in the top half of the cart. The insert can be raised and lowered in the cart to this end, so as to enable trays located in the bottom part of the cart to be raised to the upper part thereof.

Figure 2:
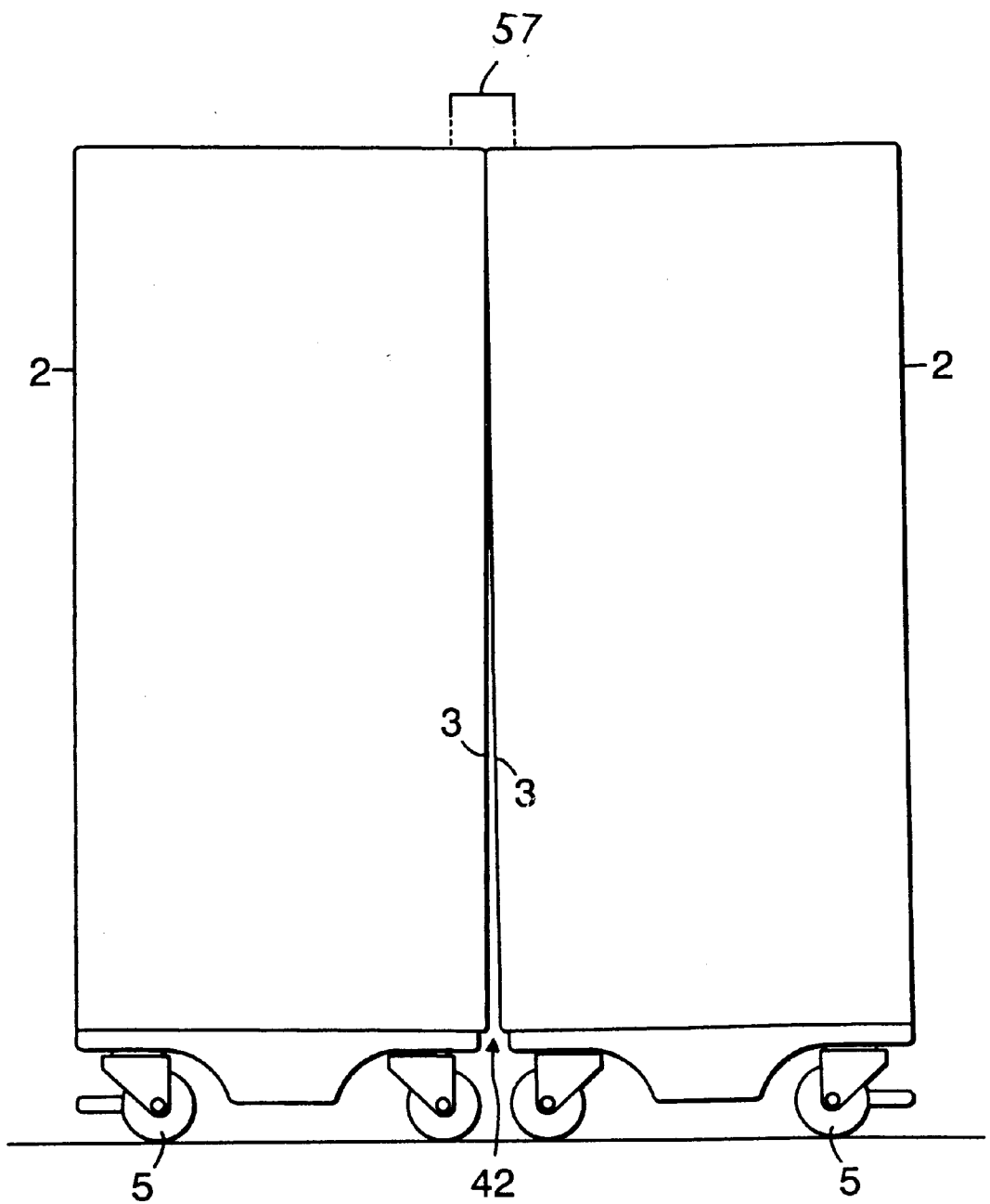
Figure 3:
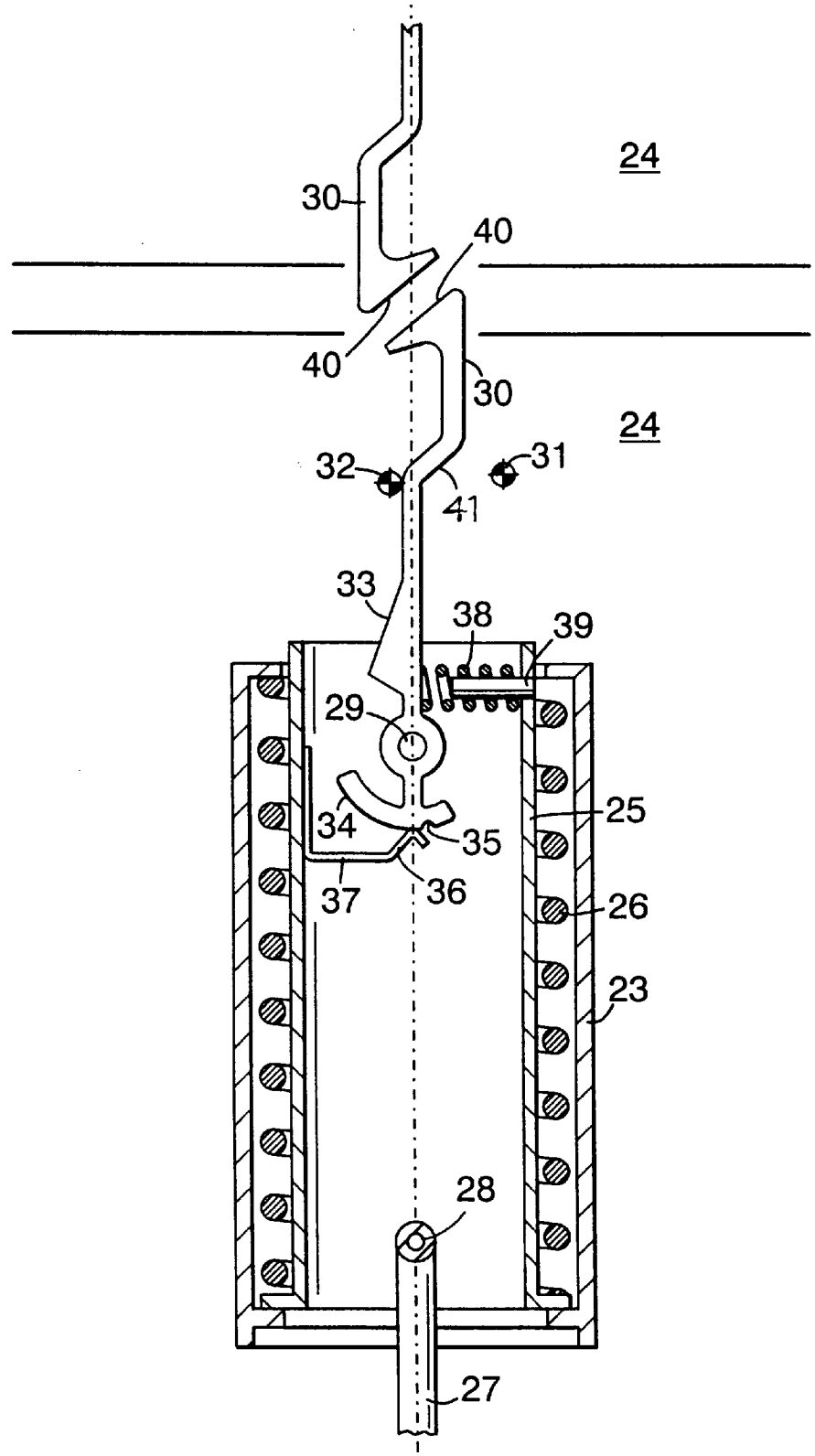
Figure 4:
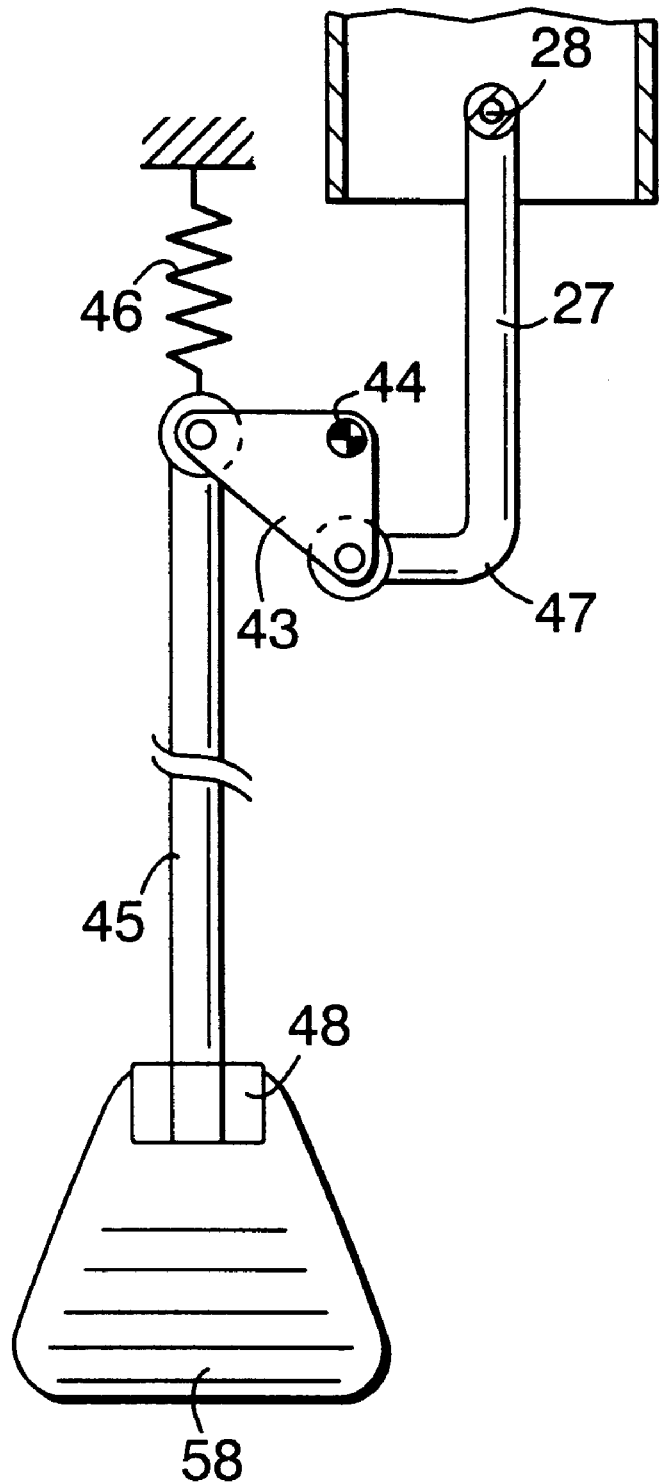

FIG. 2 illustrates schematically two inventive mutually coupled catering carts. The catering carts are coupled back-to-back, such as to provide a cart that is accessible from both of its front sides 2, for instance for serving passengers in the cabin of an aircraft. The easily manoeuvered, single catering cart shown in FIG. 1 is herewith converted to a double-capacity catering cart combination to which access can be had from both ends of the cart. FIGS. 3 and 4 illustrate the means for coupling the carts together. The illustrated coupling means comprises a tubular sleeve 23 which is fastened to the bottom part of the cart, said bottom part being indicated at 24. The sleeve 23 encloses a tubular maneuvering sleeve 25 which is movable axially against the action of a pressure spring 26, one end of which supports against an inwardly facing flange of the fixed sleeve 23 and the other end of which supports against an outwardly directed flange of the movable maneuvering sleeve 25. An operating rod 27 is pivotally mounted on the maneuvering sleeve 25 by means of a pivot shaft 28, for instance. The coupling also includes a hook 30 which is pivotal in the plane of the drawing about a pivot shaft 29. Two guide pins 31 and 32 are fixedly mounted in the bottom part 24. The hook 30 has a camming surface 33 and an arcuate surface 34, said arcuate surface including a notch 35. The maneuvering sleeve 25 carries a leaf spring 37 which has a projection on one end thereof. A pressure spring 38, guided by a pin 39, is mounted between the maneuvering sleeve 25 and the hook 30.

The end of the operating rod 27 is connected to a pedal 58 provided, for instance, at the bottom of the cart on the front side 2 thereof, said pedal functioning to maneuver the rod 27, and therewith also the maneuvering sleeve 25, i.e. to move the sleeve 25 axially in the fixed sleeve 23, through the medium of a link system. The link system is comprised of a bell-crank lever 43 pivotally mounted on a pivot shaft 44, and a pedal rod 45 which is mounted in a bearing at one end of the bell-crank lever and pivotally supported by a lever arm 48 which is connected at right angles to the pedal 58 and extends up out of the plane of the paper. Mounted in the extension of the pedal rod is a pull spring 46 which strives to rotate the bell-crank lever 43 in a clockwise direction. The operating rod 27 has a knee bend 47 of 90° at its point of pivotal attachment to the bell-crank lever 43. Thus, when the pedal is pressed down the pedal rod 45 is moved so as to draw the hook 30 inwards and therewith couple the carts together, wherewith the spring 46 coacts in rotating the bell-crank lever 43 so as to bring the point at which the operating rod 27 is pivotally attached to the bell-crank lever "inwardly of" the pivot shaft 44 of said bell-crank lever, thereby obtaining a so-called snap-over or flip-over effect, i.e. self-locking of the link system. This results in secure coupling of the carts.

The two carts, or trolleys, shown in FIG. 2 are coupled in the following manner. Beginning from the position shown in FIG. 3, the maneuvering sleeve 25, and therewith the hook 30, is moved towards a corresponding hook 30 on the other cart, for instance by depressing the pedal. The oblique surfaces 40 of the hooks 30 therewith slide against one another while causing the hooks to swing against the action of the springs 38, until the hooks snap-in behind one another. When pressure on the pedal is removed, the spring 26 will pull the carts together with the aid of the other hook and its spring until equilibrium is reached between the springs, therewith coupling the carts together. At the same time, the pull spring 46 causes the linkage system that includes the bell-crank lever 43 to "snap-over". It will be understood that the forces exerted by the springs 26 is sufficient to couple the carts and to hold said carts together. The carts are uncoupled by rotating the bell-crank lever through the medium of the pedal 58, thereby moving the maneuvering sleeve 25 and the hook 30 to an extent such as to bring the camming surface 33 of the hook 30 into contact with the guide pin 32, said hook already being distanced axially from the hook of the second cart in this position, whereby the hook 30 is swung out of the active range of the other hook. In this position of the hook 30, the projection 36 on the leaf spring 37 will snap into the notch 35 and thereby hold the hook 30 in its outwardly swung position. When the force on the pedal is removed, the maneuvering sleeve 25 will be drawn down and the sloping neck 41 on the hook 30 will strike against the guide rod 31, said guide rod therewith forcing the hook 30 back to the starting position shown in FIG. 3 against the force exerted by the leaf spring 37.

As indicated in FIG. 2, a gap 42 is defined between the bottoms of respective carts when the carts are placed back-to-back. This gap, or spacing, 42 is obtained by sloping the rear sides 3 of the carts or by providing the rear sides of said carts with mutually coacting strips. The purpose of the gap is to lift the mutually adjacent wheels of the two carts from the underlying support surface when coupling the carts together, therewith enabling the mutually coupled pair of catering carts or trolleys to be maneuvered more easily. The carts are also locked together at the tops thereof, for instance with the aid of a pair of generally U-shaped fasteners that are inserted down into openings provided at the top of the carts. FIG. 2 indicates one such U-shaped bracket at 57. It will be understood that other forms of coupling means can be used and that the upper coupling means may also be made maneuverable by the pedal together with the hooks 30.

What is claimed is:

1. A catering cart having a height that is substantially greater than its width and its length comprising four wheels, a side with an access opening, a side opposite the side with an access opening, and coupling means, wherein the cart is supported on said four wheels, and at least two of said wheels being castor wheels wherein two of said carts can be coupled together with said sides opposite said access openings facing towards one another with the aid of coupling means mounted on respective carts, wherein each of said coupling means is maneuverable from said side of the cart having said access opening; with said side opposite the side with an access opening having an overhang such that prior to coupling the carts together a gap is formed between the bottom parts of respective carts in the proximity of said coupling means, said gap being reduced to zero when the carts are coupled together whereby the carts are supported in a mutually inclined position solely by the outer wheel pairs.

2. A catering cart according to claim 1, wherein the cart further comprises top-mounted fastener means for latching the upper part of one of said carts to the upper part of another of said carts.

3. A catering cart according to claim 1, further comprising a maneuvering slide, a spring device, a hook having an oblique end surface, a first spring, a first camming surface; a second spring having a snap and a second camming surface wherein said coupling means includes said maneuvering slide which can be moved axially by said spring device and which carries said hook mounted for pivotal movement in said slide; wherein the oblique end-surface of said hook forms a slide surface for coaction with a corresponding slide surface on a hook on the other cart; wherein pivotal movement of said hook is counteracted by said first spring; said hook having said first camming surface which when said maneuvering slide and therewith said hook is moved axially causes said hook to be released from its engagement with the hook in the other cart; said second spring having a snap action retaining the hook in said released position against the action of said first spring; and said hook including said second camming surface functions to return said hook to its starting position when retracting said maneuvering slide and therewith said hook.

4. A catering cart according to claim 3, further comprising a foot pedal wherein said maneuvering slide is connected to said foot pedal for movement of said maneuvering slide and therewith of said hook.

5. A catering cart according to claim 3, further comprising a sleeve, a first guide pin and a second guide pin, wherein said maneuvering slide is mounted in said sleeve fixedly mounted on the cart, and wherein the respective said first camming surface and said second camming surface guide against the respective first guide pin and said second guide pin fixedly mounted on the carriage.

* * * * *